United States Patent
Kubitzek et al.

[11] 3,723,934
[45] Mar. 27, 1973

[54] PHOTOSENSITIVE TRANSDUCER

[75] Inventors: Alfred Kubitzek, 8022 Grunwald; Kurt Borowski, 8 Munich 90, both of Germany

[73] Assignee: Agfa-Gevaert Aktiengesellschaft, Leverkusen, Germany

[22] Filed: Mar. 23, 1971

[21] Appl. No.: 127,238

[30] Foreign Application Priority Data

Mar. 26, 1970 Germany...................P 20 14 871.4

[52] U.S. Cl. .............................................338/15
[51] Int. Cl. ..........................................H01c 7/08
[58] Field of Search................338/15, 13; 250/211 K

[56] References Cited

UNITED STATES PATENTS

| | | | |
|---|---|---|---|
| 3,414,730 | 12/1968 | Nicolas | 250/211 K |
| 3,193,686 | 7/1965 | Heinz | 250/211 K |
| 3,087,069 | 4/1963 | Moncrieff-Yates | 250/211 K |
| 3,035,177 | 5/1962 | Hanlet | 338/15 |
| 2,957,152 | 10/1960 | Vangool | 338/15 |

OTHER PUBLICATIONS

IBM Technical Disclosure Bulletin; 8/61; page 91; "Variable Resistor Element"

Primary Examiner—R. Skudy
Attorney—Michael S. Striker

[57] ABSTRACT

A photosensitive transducer for determining the orientation of light beams having a predetermined diameter has a straight row of transducer portions of identical size but of different sensitivity. Such transducer portions may include differently dimensioned parts of a trumpet-shaped photoconductive layer, or identically dimensioned parts of a photoconductive layer overlapped by filters of different light transmissivity.

6 Claims, 5 Drawing Figures

Patented March 27, 1973 3,723,934

INVENTOR
ALFRED KUBITZEK
KURT BOROWSKI

BY
*Attorney*

3,723,934

PHOTOSENSITIVE TRANSDUCER

BACKGROUND OF THE INVENTION

The present invention relates to improvements in photosensitive transducers, especially to improvements in photosensitive resistors. More particularly, the invention relates to improvements in transducers which are especially suited for evaluation of light beams having a constant cross-sectional area.

SUMMARY OF THE INVENTION

An object of the invention is to provide a photosensitive transducer which can be used in connection with galvanometers or the like to indicate the orientation of a light beam or to indicate the position of the transistor with reference to a light beam.

Another object of the invention is to provide a photosensitive transducer, especially a resistor, which can be used with advantage in certain types of range finders and which can be installed in many types of photographic apparatus.

A further object of the invention is to provide a photosensitive transducer of accurately determined sensitivity in selected portions thereof.

An additional object of the invention is to provide a photosensitive transducer which can be used as a convenient, compact and superior substitute for an entire set of conventional photosensitive transducers.

The invention is embodied in a photosensitive transducer, particularly in a resistor for evaluation of the orientation of a light beam of predetermined cross-sectional area. The transducer comprises a plurality of transducer portions of different sensitivity which are of equal size and together form a series or row of transducer portions of different sensitivity extending in a predetermined direction, preferably along a straight line. The transducer portions of different sensitivity may form a series, as considered in the aforementioned direction, and the sensitivity of successive transducer portions of such series may vary in accordance with a predetermined pattern.

In accordance with a first embodiment of the invention, the transducer comprises a photoconductive layer and two current-conducting bodies flanking the layer so as to expose a strip of the layer. Such strip may constitute a portion of or the entire layer and has a width which varies in the predetermined direction. Each transducer portion of different sensitivity includes a portion of the strip and each such strip portion has a different area. For example, the width of the strip may increase stepwise or continuously from the one to the other end of the strip. If the width of the strip is to change continuously, the strip may have the outline of a trumpet, i.e., it can be flanked by convex edge faces of the two current-conducting bodies.

In accordance with a second embodiment of the invention, the transducer comprises a substantially rectangular layer consisting of photoconductive material and extending in the predetermined direction, two current-conducting bodies which flank the layer, and a filter (e.g., a grey wedge) which overlies the layer. The light transmissivity of the filter varies in the predetermined direction and each transducer portion of different sensitivity includes a portion of the layer and the overlapping portion of the filter. The area of each such layer and filter portion is the same.

When a beam of constant cross-sectional area is caused to travel in the predetermined direction, it impinges on transducer portions of different sensitivity whereby the transducer furnishes signals which are indicative of the orientation of the beam. Also, the transducer can be moved with reference to the beam until a transducer portion having a certain sensitivity is located in the path of light.

The novel features which are considered as characteristic of the invention are set forth in particular in the appended claims. The improved transducer itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
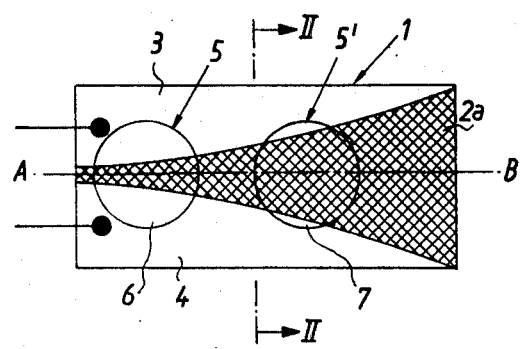
FIG. 1 is a schematic plan view of a photosensitive transducer which embodies one form of the invention.
Figure 2:
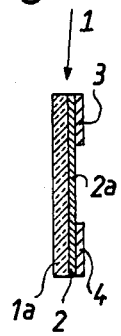
FIG. 2 is a sectional view as seen in the direction of arrows from the line II—II of FIG. 1.

Referring first to FIGS. 1 and 2, there is shown a photosensitive resistor 1 having a rectangular plate-like support 1a of insulating material one side of which is coated with a layer or film 2 of photoconductive material. The layer 2 is partially overlapped by two plate-like bodies 3,4 of current-conducting material which leave exposed a strip-shaped section 2a of the layer 2. The width of the strip 2a increases continuously in a direction from the left to the right, as viewed in FIG. 1, in accordance with a predetermined pattern which is determined by the configuration of the curved edge faces of the bodies 3 and 4. In FIG. 1, the bodies 3, 4 expose a trumpet-shaped strip 2a having two halves which are mirror symmetrical to each other with reference to a plane including a line A-B. The transducer 1 can be used to evaluate the orientation of a light beam 5 having a predetermined cross-sectional area and being reflected, for example, on a spot of an object whose distance from the transducer is to be measured. If the zone where the beam 5 impinges on the transducer 1 is to be shifted in a predetermined direction, as indicated by the line A-B, or vice versa, the beam 5 impinges on successive portions of the transducer and each such transducer portion has a different sensitivity (it being assumed that the intensity of light of the beam 5 is constant). Thus, the sensitivity of the transducer portion 6 which is exposed to the light beam 5 has a first value, the sensitivity of the transducer portion 7 which is exposed to the beam when the latter assumes the position 5' has a greater second value, and so forth, depending on the exact location of the zone which is exposed to light of the beam 5.

Figure 3:
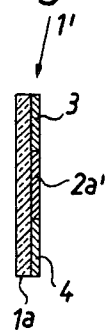
FIG. 3 is a similar sectional view of a second transducer.

It is clear that the transducer 1 can be replaced with a transducer 1' (FIG. 3) wherein the bodies 3, 4 are applied directly to the support 1a and the photoconductive layer 2 is replaced with a layer 2a' which is identical with the section or strip 2a of the transducer 1.

Figure 4:
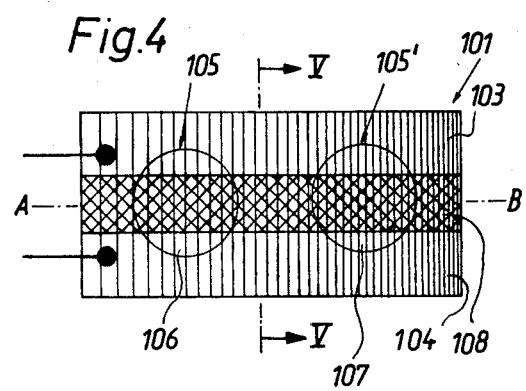
FIG. 4 is a plan view of a third transducer.
Figure 5:
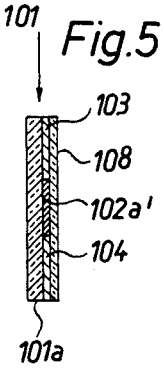
FIG. 5 is a sectional view as seen in the direction of arrows from the line V—V of FIG. 4.

FIGS. 4 and 5 illustrate a transducer 101 having a rectangular support 101a, a strip-shaped photoconductive layer or film 102a' of constant width, and two plate-like current-conducting bodies 103, 104 of constant width. The layer 102a' is flanked by the bodies 103, 104 and is overlapped by a filter 108 (e.g., a grey wedge) whose light transmissivity decreases in the direction from the left to the right as indicated by the line A-B. The line A-B extends lengthwise of and halves the strip 102a'.

The sensitivity of successive portions 106, 107 . . . of the transducer 101 varies in the direction indicated by the line A-B. Each such transducer portion includes a portion of the strip 102a' and a portion of the filter 108. The area of each portion of the strip 102a' and of the overlapping portion of the filter 108 equals the cross-sectional area of the light beam 105. In the solid-line position of FIG. 4, the beam 105 impinges against the transducer portion 106 having a first sensitivity; in the position 105', the beam 105 impinges upon the portion 107 having a second sensitivity.

It is clear that the improved transducer can be modified in a number of additional ways without departing from the spirit of the invention. For example, the width of the strip 2a or 2a' can vary in stepwise fashion or in part continuously and partly in stepwise fashion. Also, the filter 108 can be provided with discrete sections of different transmissivity so that the sensitivity of the transducer 101 varies stepwise rather than continuously. Furthermore, the transducer can embody a first series of transducer portions whose sensitivity varies linearly, alternating with a second series of transducer portions whose sensitivity varies stepwise or irregularly, depending on the intended use of the transducer.

The improved photosensitive transducer can be used for a variety of purposes, for example, in a range finder of the type disclosed in the copending application Ser. No. 125,737 filed Mar. 18, 1971 by Bestenreiner et al. and owned by the assignee of the present application. Said application discloses a range finder wherein a light source emits a first light beam which is reflected on a spot of the object and is directed against a transducer of the type shown in FIG. 1. The angle between the emitted and reflected light beams is indicative of the distance between the range finder and the object. Thus, the sensitivity of that portion of the transducer which is exposed to the reflected beam (e.g., the transducer portion 6 or 7) is indicative of the angle between the two beams and hence of the distance from the object. The transducer is connected in an electric circuit which includes a moving-coil measuring instrument having an output member arranged to move along a scale with graduations indicating various distances from the object. The angular position of the output member is a function of the position of the zone where the reflected beam impinges on the transducer, as considered in the direction of the line A-B. The output member can be scanned by a device which can adjust the position of the picture taking objective in a camera with reference to the plane of the film. Also, the transducer can be incorporated in any other instrument or apparatus which is used for photooptical scanning, for example, where a light beam having a constant cross-sectional area is deflected by a rotary or otherwise movable mirror or the like so as to change its orientation and to thereby impinge on different portions of the transducer, i.e., on portions of different sensitivity. The transducer can be mounted on a carriage which moves it with reference to a light beam until the light beam impinges on a predetermined portion of the transducer to thus place one or more devices in a predetermined position with reference to the light beam. Thus, the light beam can be moved with reference to the transducer or vice versa.

The transducer can be installed in an arm or branch of a bridge circuit which is unbalanced when the light beam moves away from a predetermined portion of the transducer. The transducer is then mounted for movement with reference to the beam so that the latter is caused to impinge on the predetermined transducer portion to thereby balance the circuit. The transducer can be moved by means of a suitable servo system which is arrested in response to a signal from the transducer as soon as the beam impinges on the predetermined portion having a specific sensitivity which insures the balancing of the bridge circuit.

The photosensitive layer might be of CdS or CdSe, the support of plastic foil and the electrodes of metal such as Nickel-silver or weak-Brass.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A photosensitive transducer, particularly a resistor for evaluation of the orientation of a light beam of predetermined cross-sectional area, comprising a substantially rectangular layer consisting of photoconductive material and extending in a predetermined direction, two current-conducting bodies flanking said layer, and a filter overlying said layer, the light transmissivity of said filter varying in said predetermined direction and portions of said layer and the overlapping portions of said filter constituting a plurality of transducer portions of different sensitivity, said transducer portions of different sensitivity being of equal size and together forming a series extending in said predetermined direction.

2. A transducer as defined in claim 1, wherein said transducer portions of different sensitivity form a series of successive transducer portions, as considered in said direction, and the sensitivity of said series of successive transducer portions varies in accordance with a predetermined pattern.

3. A transducer as defined in claim 1, wherein said filter is a grey wedge.

4. A transducer as defined in claim 1, wherein said transducer portions of different sensitivity form a straight row.

5. A transducer as defined in claim 1, wherein each of said transducer portions has a substantially circular outline.

6. A transducer as defined in claim 1, further comprising an insulating support for said transducer portions.

* * * * *